(12) United States Patent
Shimogama et al.

(10) Patent No.: US 6,374,156 B1
(45) Date of Patent: Apr. 16, 2002

(54) ROBOT CONTROL SYSTEM

(75) Inventors: Shigeru Shimogama; Hiroshi Nakajima, both of Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/539,151

(22) Filed: Mar. 30, 2000

(30) Foreign Application Priority Data

Apr. 1, 1999 (JP) .......................................... 11-094686

(51) Int. Cl.[7] .............................................. G06F 19/00
(52) U.S. Cl. ........................ 700/245; 700/178; 700/180; 700/184; 700/247; 700/249; 318/568.2; 318/568.12; 318/568.22; 345/634
(58) Field of Search ................................ 700/245, 184, 700/178, 249, 247, 180; 318/568.12, 568.2, 568.22; 345/634

(56) References Cited

U.S. PATENT DOCUMENTS

| 5,046,022 A | | 9/1991 | Conway et al. | |
| 5,416,715 A | * | 5/1995 | Kinoshita et al. | ............ 700/178 |
| 5,581,457 A | | 12/1996 | Tsukahara | |
| 5,587,638 A | * | 12/1996 | Kato et al. | ............. 318/568.14 |
| 5,739,655 A | * | 4/1998 | Torii et al. | ............. 318/568.12 |
| 6,134,102 A | * | 10/2000 | Worn et al. | ................. 361/680 |

FOREIGN PATENT DOCUMENTS

| EP | 0 351 434 A | | 1/1990 |
| EP | 0 590 154 A | | 4/1994 |
| EP | 1040893 A2 | * | 10/2000 |
| JP | 5-265527 | | 10/1993 |

OTHER PUBLICATIONS

Fardanesh et al., Minimum cycle time loaciont of a task in the workspace of a robot arm, 1988, IEEE, pp. 1280–2283.*
Brantmark et al., Man/machine communication in ASEA'S new robot controller, 1982, ASEA Journal, vol. 55 No. 6.*

* cited by examiner

Primary Examiner—William A. Cuchlinski, Jr.
Assistant Examiner—McDieunel Marc
(74) Attorney, Agent, or Firm—Pearne & Gordon LLP

(57) ABSTRACT

A key input section which permits the execution of output controls is provided on a teach pendant. A control unit of a robot control system ignores all input movement requests to move the robot if a key of the key input section is depressed and if an output of the key is an output set for prohibiting the movement of the robot and is in an output state that is set.

8 Claims, 6 Drawing Sheets

FIG.3A

INTERNAL SETTING
:EXTENSION FUNCTION
——INTERLOCK OUTPUT——1/2——

| No. | STANDSTILL STATE | No. | STANDSTILL STATE |
|---|---|---|---|
| 1 | ( ON  OFF ) | 6 | ( ON  OFF ) |
| 2 | ( ON  OFF ) | 7 | ( ON  OFF ) |
| *3 | ( ON  OFF ) | 8 | ( ON  OFF ) |
| 4 | ( ON  OFF ) | 9 | ( ON  OFF ) |
| 5 | ( ON  OFF ) | *10 | ( ON  OFF ) |

INTERNAL SETTING
:EXTENSION FUNCTION
——INTERLOCK OUTPUT——1/2——

| No. | STANDSTILL STATE | No. | STANDSTILL STATE |
|---|---|---|---|
| 11 | ( ON  OFF ) | *16 | ( ON  OFF ) |
| 12 | ( ON  OFF ) | | |
| 13 | ( ON  OFF ) | | |
| 14 | ( ON  OFF ) | | |
| 15 | ( ON  OFF ) | | |

25b

GUN OPEN STATE

GUN CLOSE STATE

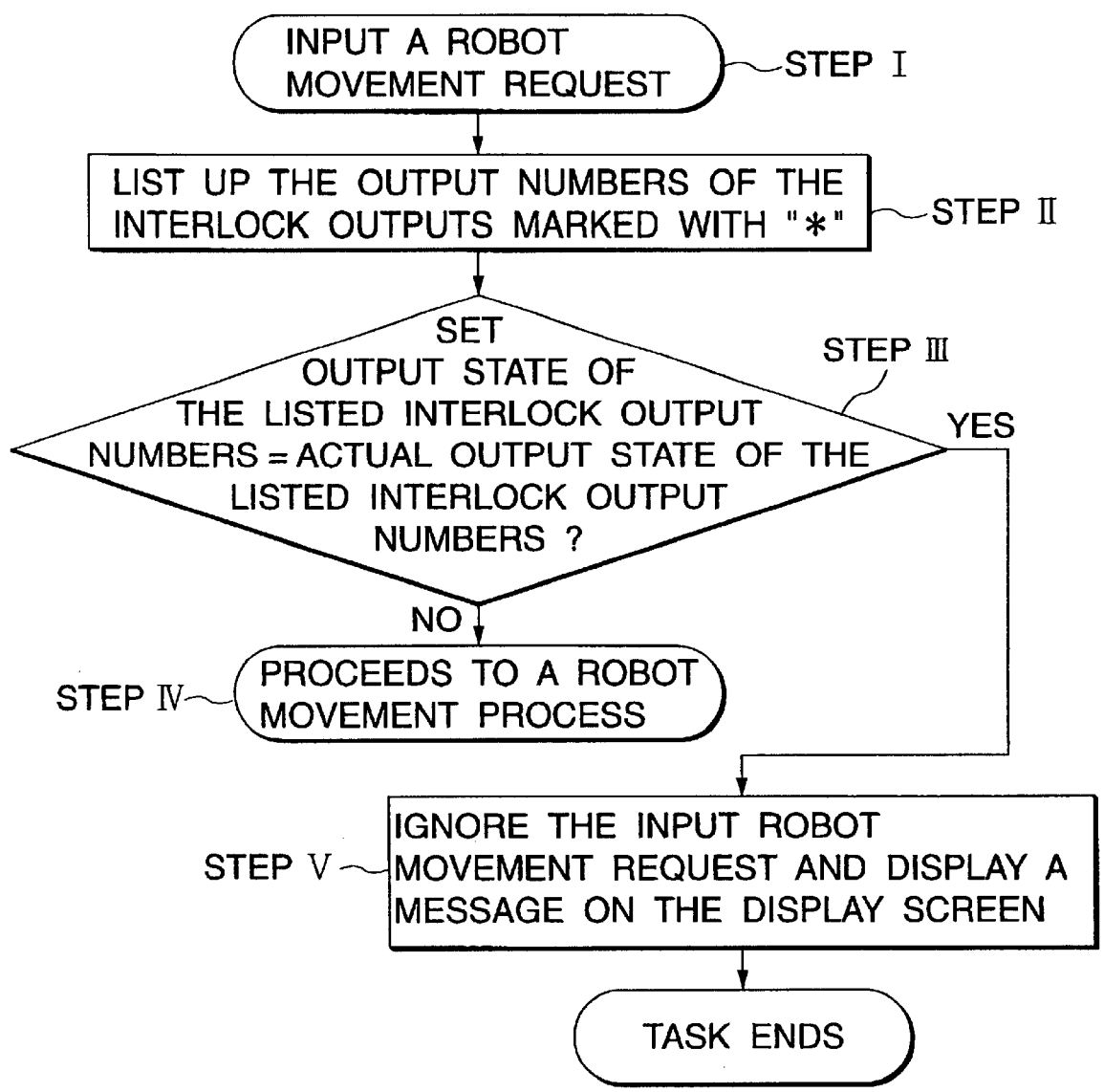

ROBOT CONTROL SYSTEM

BACKGROUND OF THE INVENTION

The present invention relates to a robot control system for performing input and output controls to and from external tools, for example.

A device for teaching operation programs to a robot, by convention, is provided with a plurality of operation keys. Each of those keys is able to controlling one output alone.

To execute a series of input/output controls (an input/output control sequence) when the robot is taught an operation program, a list of input/output control commands stored are displayed on a display and a desired one is selected from those commands.

Consequently, an input/output control is performed by depressing a key for instructing the input/output control.

Where a plurality of keys for instructing input/output controls are provided, the operator must memorize or make a note of the contents of input/output control commands assigned to the keys.

Conventionally, since the operator executes the output control by depressing a key for instructing the output control, which is provided in the teaching device, any interlocking action concerning to the movement of the robot is not taken from the robot side.

When the operator mistakenly or involuntarily operates to move the robot in a state that an external machine grasps a work piece, a robot arm, there is a danger that a final working machine and/or the work piece will be damaged.

When those are damaged, much time and money are consumed for repairing the damaged ones.

SUMMARY OF THE INVENTION

Accordingly, an object of the present invention is to provide a robot control system which is capable of taking a CTRL interlocking of a teach pendant in order to teach the robot.

According to the first aspect of the invention, a robot control system comprises: a control unit for controlling an operation of a robot by the teaching of an operation program; teaching means having a plurality of keys for teaching an operation program by transmitting data to the control unit; input/output control means for inputting and outputting data to and from an external machine connected thereto and a hand attached to an arm of the robot; a control unit for assigning functions to instruct a control of the input/output control means to keys of the teaching means; storage means for storing the functions assigned to the keys; and storage means for storing designation conditions to place the robot in a standstill state when the assigned functions are executed. With such an arrangement, a series of input/output controls can be carried out through the operation of one key. Further, the robot can be stopped when the assigned functions are executed. Therefore, it is possible to prevent the damage of the arm of the robot, the work piece and the like, which is caused by the mistaken operation.

According to the second aspect of the invention, a robot control system comprises: a control unit for controlling an operation of a robot by the teaching of an operation program; teaching means having a plurality of keys for teaching an operation program by transmitting data to the control unit; input/output control means for inputting and outputting data to and from an external machine connected thereto and a hand attached to an arm of the robot; a control unit for assigning functions to instruct a control of the input/output control means to keys of the teaching means; storage means for storing the functions assigned to the keys; and storage means for storing designation conditions to place the robot in a standstill state when the assigned functions are not executed. With such an arrangement, a series of input/output controls can be carried out through the operation of one key. Further, the robot is placed in a standstill state when the assigned functions are not executed. In other words, the robot may be operated only when the assigned functions are executed. Therefore, it is possible to prevent the damage of the arm of the robot, the work piece and the like, which is caused by the mistaken operation.

Preferably, the control system of the invention includes storage means for storing designation conditions for placing the robot in a standstill state when the assigned functions are executed or not executed. With provision of the storing means, a series of input/output controls can be carried out through the operation of one key. Further, the robot is placed in a standstill state when the assigned functions are executed or not executed. Additionally, a state of the output to the robot at that time is stored. Therefore, the robot can be operated on an as needed base. The setting is easy. Further, it is possible to prevent the damage of the arm of the robot, the work piece and the like, which is caused by the mistaken operation.

Further, the control system of the invention includes a storage backup battery for backing up the storage of the storage means. With provision of the battery, if the power supply to the robot control system is stopped, the setting of various items can be retained.

BRIEF DESCRIPTION OF THE DRAWINGS

FIGS. 3A and 3B are diagrams showing examples of displays in the embodiment.

FIG. 5 is a block diagram showing an operation of the embodiment.

DETAILED DESCRIPTION OF THE PREFERRED EMBODIMENTS

The preferred embodiments of the present invention will be described with reference to the accompanying drawings.

Figure 1:
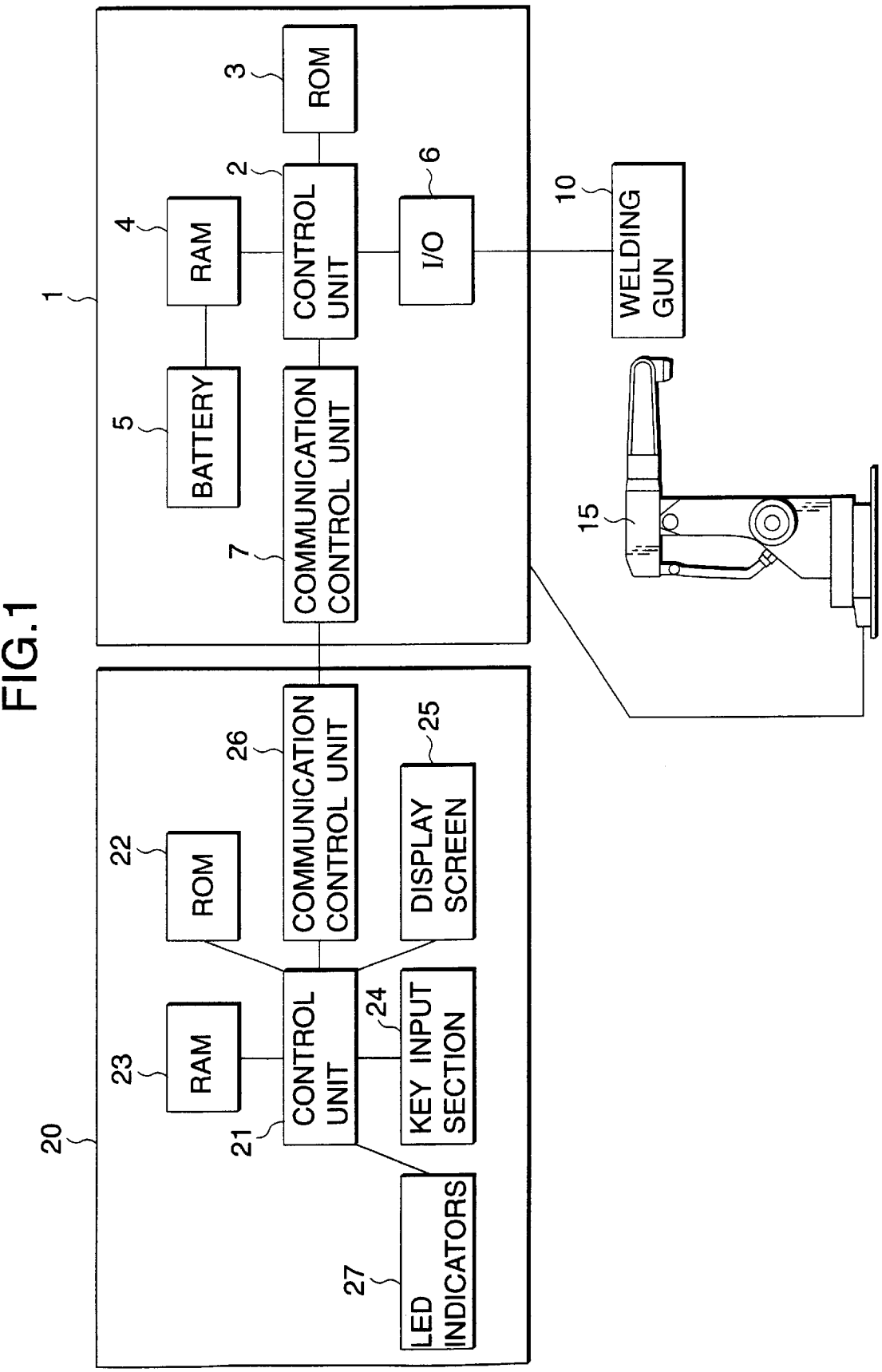
FIG. 1 is a block diagram showing an overall arrangement of an embodiment of the present invention.

In FIG. 1 showing the embodiment of the invention, a robot control unit 1 is connected to a robot 15, to thereby control the latter.

The robot control unit 1 is made up of a control unit 2 which computes program operations of the robot 15 to control the robot 15, a ROM 3 and a RAM 4 as storage means connected to the control unit 2, a storage backup battery 5 connected to the RAM 4, an I/O unit 6 as input/output control means connected to the control unit 2, and a communication control unit 7.

Control procedures are stored in the ROM 3. Parameters for operations, e.g., teaching data, by the control unit 2 are stored in the RAM 4.

The robot control unit 1 is connected to a welding gun 10 as an external machine through the I/O unit 6. It is further connected to a teach pendant 20 as teaching means for forming teach programs of the robot 15 through the communication control unit 7.

The teach pendant 20 is made up of a control unit 21 for controlling operations of the teach pendant 20, a ROM 22 and a RAM 23 as storage means coupled to the control unit 21, a key input section 24, a display screen 25, a communication control unit 26, and LED indicators 27.

A control procedure for controlling the teach pendant 20 is stored in the ROM 22. Parameters for operations by the control unit 21 are stored in the RAM 23.

The outputting control of teach data of the robot 15 and other data is performed by use of the key input section 24. The key input section 24 is given the function of recognizing input states of the keys of the key input section 24, through the communication control units 7 and 26 and the control unit 21.

Figure 2:
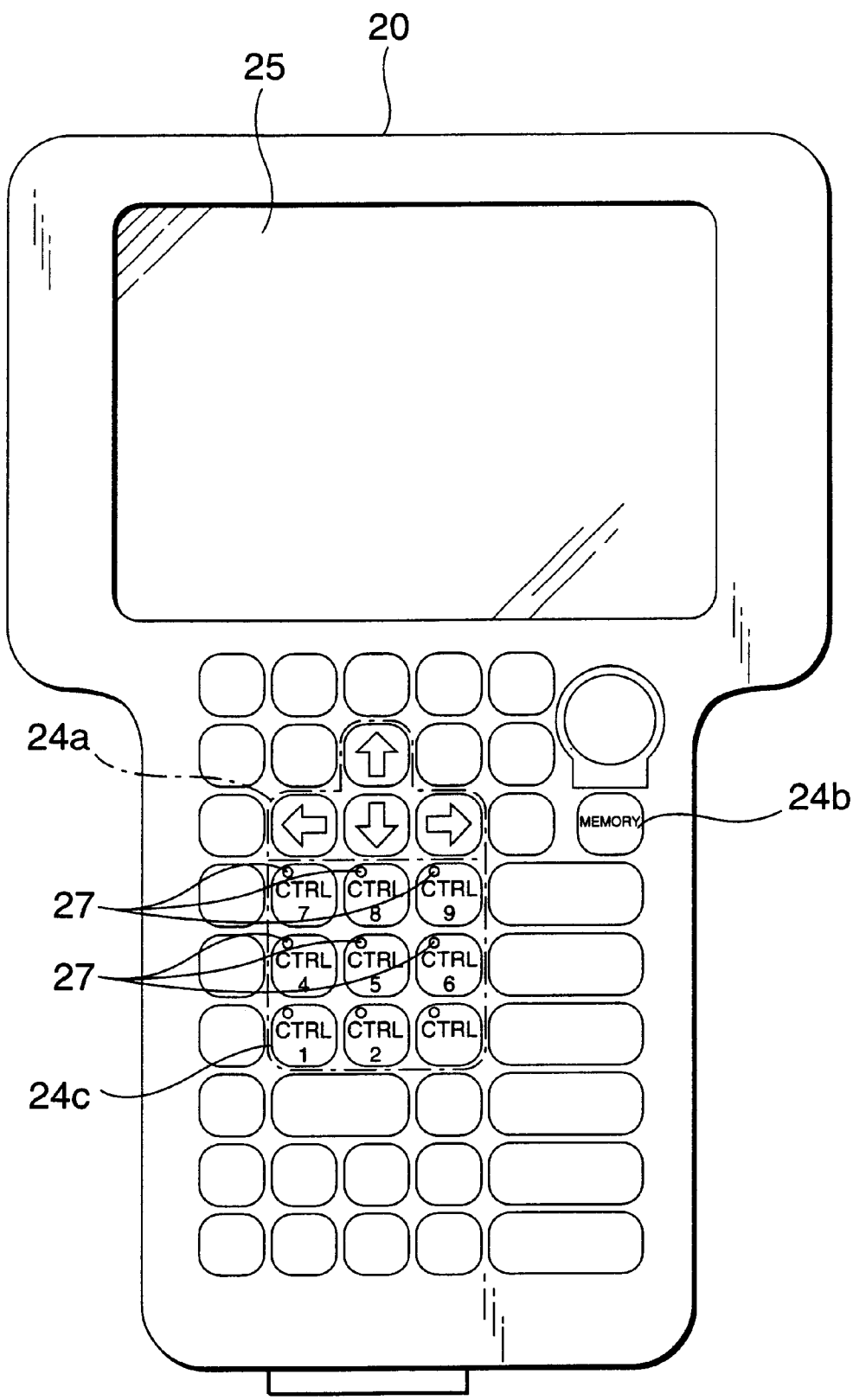
FIG. 2 is an external appearance of a teach pendant in the embodiment.

In FIG. 2, CTRL1 to CTRL9 keys (referred to as CTRL key group) 24-c, which form the key input section 24, are provided for executing ON/OFF during the teaching of the actual output numbers of the I/O unit 6. The operator performs operations, for example, the assigning to the CTRL keys in accordance with a control procedure that is stored in the ROM 3 shown in FIG. 1, by use of the teach pedant of FIG. 2. In accordance with the operator's operation information, the control unit 2 assigns an actual output number of the I/O unit 6 to a key of the CTRL key group 24-c through the teach pendant 20, and stores the assignment information into the RAM 4. Thus, the operator operates in advance the teach pendant 20 to store the actual output numbers of the I/O unit 6 into the RAM 4, and assigns output control sequences that are stored in the RAM 4 to the keys of the CTRL key group 24-c. In this way, the operator may control the outputs according to a procedure to be described below. When the operator depresses one of the keys of the CTRL key group 24-c at the time of teaching the operation program, the control unit 21 recognizes the depressed CTRL key, and transmits a transmission request to the communication control unit 26. The control unit 2 receives its information through the communication control unit 7, and selects an output control sequence to be executed from the information of the output control sequences assigned to the CTRL key group 24-c, and controls the I/O unit 6 according to the contents of the selected output control sequence.

As described above, the operator can perform given output controls by operation keys of the CTRL key group 24-c.

When a state of the output assigned to the CTRL key group 24-c is ON, an LED of the LED indicator 27 is turned on. When the output state is OFF, the LED is turned off. Accordingly, the operator knows the ON/OFF of the output corresponding to the CTRL key, from the on or off state of the LED indicator 27.

The operator sets output numbers of the outputs which require the interlocking of the robot movement and their output states by use of the teach pendant 20.

In examples of setting displays in FIGS. 3A and 3B, the number of outputs is 16. The output numbers (No.) and their states requiring the interlocking of the robot movement, i.e., an output state (ON) and a non-output state (OFF), are displayed in the form of "ON OFF" on the display screen in order to make easy selections of the states (ON) and (OFF). Specifically, as shown in FIGS. 3A and 3B, a display 25-a or 25-b is presented on a liquid crystal display screen of the teach pendant 20. In the embodiment, a cursor flickers first at a position of the output number "1". The operator moves the cursor to a position of an output number of the output which requires the interlocking of the robot movement, by use of a "cursor movement" key group 24-a. When a "memory" key 24-b is depressed during the flickering of the cursor at a given position, that output number is inverse-displayed and fixed. Then, the cursor moves to an ON position in the "ON OFF" to set up an output state of that output number, and flickers thereat. At this time, the operator moves the cursor to an "ON" or "OFF" position by use of a "←" or "→" key of the "cursor movement" key group 24-a, and depresses the "memory" key 24-b in a state that it is flickering. In turn, the output state "ON" or "OFF" of the output number is inverse-displayed, and then the cursor moves to the next output number position. An example of the display of the interlock output thus set is the display 25-a or 25-b. The robot movement is prohibited when, in the display 25-a, an output state of the output number 3 is in an output state (ON) and the output number 10 is in a non-output state (OFF), and when, in the display 25-b, the output number 16 is in an output state (ON). In those displays 25-a and 25b, the robot-movement prohibition is indicated by displaying the alphanumeric characters in the reverse. In the embodiment, asterisk "*" is attached to the output numbers that are set.

In FIG. 4, the output number 3 is connected to a gun open/close input (solenoid (not shown)) of a welding gun 10. When the output number 3 is in an output state (ON), the welding gun 10 is closed, and when it is in a non-output state (OFF), the gun is opened. In the embodiment, the output number 3 is assigned to the key "CTRL3" of the CTRL key group 24-c of the teach pendant 20. The assignment information is stored in the RAM 4.

Incidentally, an initial output state (not shown) of the output number 3 is an "OFF" state.

Figure 4A:
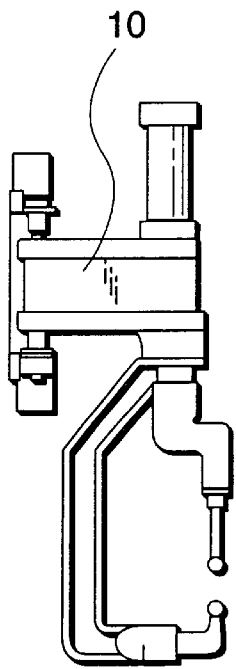
FIG. 4 is a diagram useful in explaining an operation of the embodiment.

Subsequently, when the operator depresses the key "CTRL3" of the CTRL key group 24-c during the teaching of an operation program, the control unit 2 of the robot control unit 1 receives its information through the above-mentioned communication route, selects an output control "output number 3" to be executed from the assignment information of the "CTRL3" key and the output control sequence, which is stored in the RAM 4, and controls the I/O unit 6 to place the selected output "output number 3" in a state ON. At this time, the control unit 2 of the robot control unit causes the control unit 21 of the teach pendant to turn on the LED of the "CTRL3" key of the CTRL key group 24-c, through the communication route. Accordingly, the operator knows the output state of the output number assigned to the corresponding CRTL key, from the LED indication. Through those procedural operations, the welding gun 10 as a final working machine attached to the arm of the robot 15 changes its state from a gun open state (FIG. 4A) to a gun close state (FIG. 4B), as shown in FIG. 4.

Figure 4B:
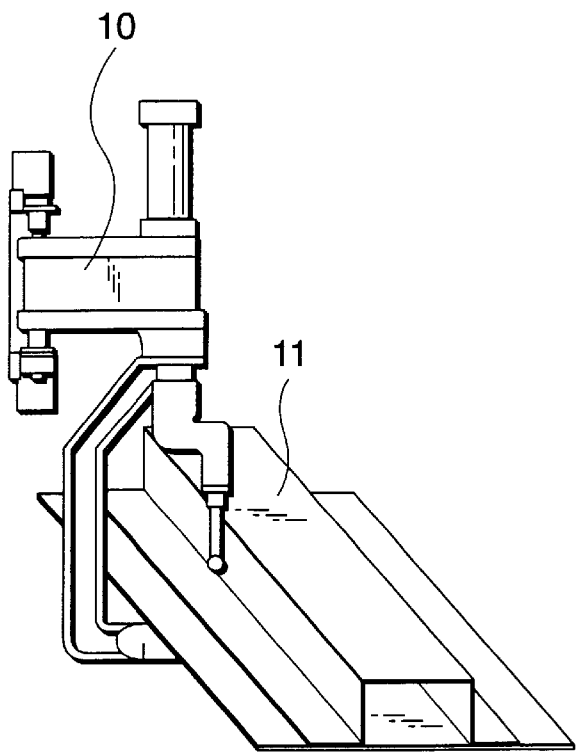
Figure 6A:
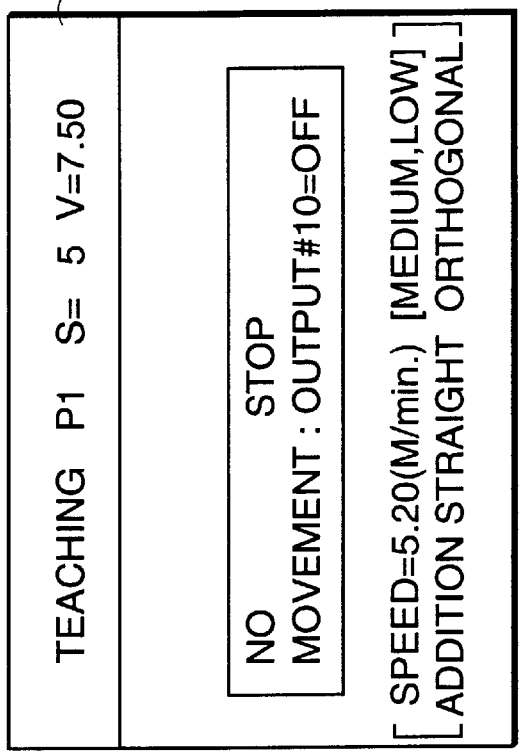
FIGS. 6A and 6B are diagrams showing examples of displays in the embodiment.
Figure 6B:
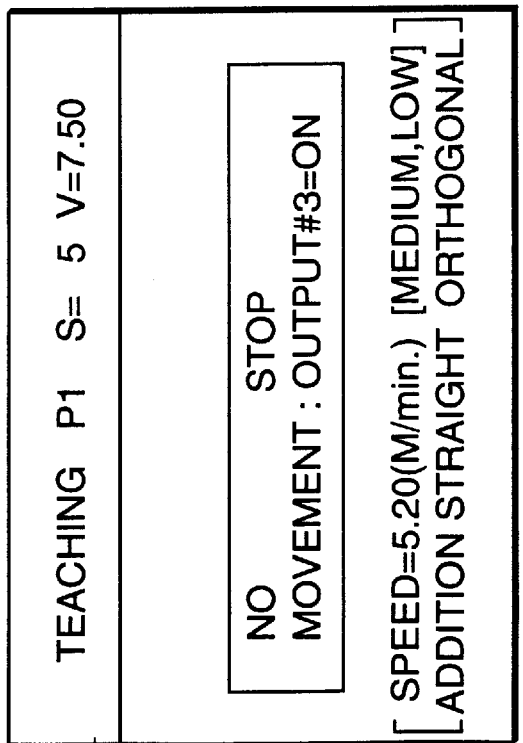

In order to check a firing position of the gun, the operator operates the welding gun and causes it to grasp a work piece 11 as in the gun closing state of FIG. 4B. Even though the operator mistakenly operates for robot movement in this case, a movement request of the robot 15 is ignored and a display 25-c (the message is "no movement: stop output #3=ON) (see FIG. 6A and 6B) is presented on the display screen 25 since, when the "output number 3" assigned to the "CTRL3" key is in an "output (ON) state, its output is designated as the interlock output, and hence the control unit 2 executes a control procedure in accordance with a flow chart shown in FIG. 5. Therefore, it is possible to prevent the robot 15, the final working machine (the welding gun 10 in the embodiment), and the work piece 11 from damaged. The flow chart of FIG. 5 follows. In response to a robot movement request that is input (step I), a task of FIG. 5 is started. The robot-interlock output numbers with "*" attached thereto are listed up (step II). Setting output states of all the listed robot-interlock output numbers marked with "*" are compared with actual output states of the I/O unit 6 (step III). If no coincidence between them is present, a robot movement process is executed (step IV). If one output state, even, is coincident with the actual one, a display as indicated by 25-c in FIG. 6A is visually presented on the display screen 25, a robot movement request is ignored (step V), and the task ends.

A second embodiment of the present invention will be described. The same portions as in the first embodiment will be omitted in description. When the "memory" key 24-b is depressed in a state that the cursor flickers at a position of the output number "10" on the display 25-a in FIG. 3A, the output number is displayed in the reverse, and fixed. The cursor moves to a position of "ON" of "ON OFF" in order to set an output state of that number, and flickers thereat. At this time, the cursor is moved to a position of "OFF" by use of the "←" and "→" keys of the "cursor movement" key group 24-a, and the "memory" key 24-b is depressed in a state that the cursor is flickering. By the operation, when the output number 10 is in a non-output state (OFF), the robot movement is prohibited. Also in the embodiment, asterisk "*" is attached to the output numbers that are set.

In FIG. 4, the output number 10 is connected to a gun open/close input (solenoid (not shown)) of the welding gun 10. When the output number 10 is in a non-output state (OFF), the welding gun 10 is closed, and when it is in an output state (ON), the gun is opened. In the embodiment, the output number 10 is assigned to the key "CTRL4" of the CTRL key group 24-c of the teach pendant 20. The assignment information is stored in the RAM 4.

Here, an initial output state (not shown) of the output number 10 is an "ON" state, and the LED of the "CTRL4" key is in an on state. In this state, when the operator depresses the key "CTRL4" of the CTRL key group 24-c during the teaching of an operation program, the control unit 2 of the robot control unit receives its information through the above-mentioned communication route, selects an output control "output number 10" to be executed from the assignment information of the "CTRL4" and the output control sequence, which is stored in the RAM 4, and controls the I/O unit 6 to place the selected output "output number 10" in a non-output state (OFF). At this time, the control unit 2 of the robot control unit causes the control unit 21 of the teach pendant to change a state of the LED of the "CTRL4" key of the CTRL key group 24-c from an on state to an off state, through the communication route. Accordingly, the operator knows the output state of the corresponding CRTL key, from the LED indication. Through those procedural operations, the welding gun 10 as a final working machine attached to the arm of the robot 15 changes its state from a gun open state (FIG. 4A) to a gun close state (FIG. 4B), as shown in FIG. 4. In order to check a firing position of the gun, the operator operates the welding gun and causes it to grasp a work piece 11 as in the gun closing state of FIG. 4B. Even though the operator mistakenly operates for robot movement in this case, a movement request of the robot 15 is ignored and a display 25-d(the message is "no movement: stop output #10=OFF) (see FIG. 5) is presented on the display screen 25 since, when the "output number 10" assigned to the "CTRL4" key is in a "non-output (OFF) state, its output is designated as the interlock output, and hence the control unit 2 executes a control procedure in accordance with the flow chart shown in FIG. 5. Therefore, it is possible to prevent the robot 15, the final working machine (the welding gun 10 in the embodiment), and the work piece 11 from damaged. Description of the flow chart of FIG. 5 is omitted since the flow chart is already described.

Since the battery 5 for backing up the RAM data storage is used, all data stored in the RAM 4 can be retained when the control power supply is shut off. Therefore, there is no need of teaching the contents already taught every time the control power source is turned on. This feature is fairly convenient.

As seen from the foregoing description, the present invention includes an input key section for permitting the execution of output controls, which is provided on a teach pendant. A control unit of a robot control system includes means which, when a key of the input key section is in a depressed state, receives a message of depressing a key for executing the output control from a control unit of the teach pendant, and executes an ON control of a given output in accordance with the assignment.

The robot control system has such a function as to always ignore all the input robot movement requests when the ON control of the given output is performed. Therefore, damage of the final working machine, robot arm, work piece, and the like is prevented before it happens.

The present invention includes an input key section for permitting the execution of output controls, which is provided on a teach pendant. A control unit of a robot control system includes means which, when a key of the input key section is in a depressed state, receives a message of depressing a key for executing the output control from a control unit of the teach pendant, and executes an OFF control of a given output in accordance with the assignment.

The robot control system has such a function as to always ignore all the input robot movement requests when the OFF control of the given output is performed. Therefore, damage of the final working machine, robot arm, work piece, and the like is prevented before it happens.

In the conventional technique, an actuator operation state of an external machine is sensed by a sensor located in close proximity to it, a limit switch, or the like, and a signal derived from the sensing device is led to the robot. The robot movement is interlocked by use of an input wait command of the robot. Therefore, when a connection harness between the sensor and the robot control system is disconnected, the robot is inoperable or the resource of the robot control system is inevitably consumed since the input of the robot is exclusively used by the interlocking execution. In the present invention, the robot movement is interlocked by use of the output from the robot per se, not the external input thereto. Therefore, the above two problems are substantially solved.

The invention includes means for displaying an output number of an output which requires the interlocking of the robot and its output state (ON or OFF state) on the display screen of the teach pendant, for the purpose of easy setting of them by the operator.

A control unit of the robot control system stores an output number to interlock the robot movement and its output state when the robot movement is interlocked into a RAM thereof through communication control units of the teach pendant and the robot control system. The setting is very easy.

The invention includes a battery for backing up the RAM data storage. Accordingly, if a main power supply is shut off, the output number to interlock the robot movement and its interlock output state can be retained. This feature is very convenient.

What is claimed is:

1. A robot control system comprising:

teaching means which have a plurality of keys for teaching an operation program;

robot control unit which controls an operation of a robot by the teaching of the operation program, which includes:

input/output control means which inputs and outputs input/output control data from and to an external machine connected thereto and a hand attached to an arm of a robot;

a control unit which assigns functions to instruct a control of the input/output control means to the keys of the teaching means;

a first storage means which stores the functions assigned to the keys, a second storage means which stores designation conditions to place the robot in a standstill state when the assigned functions are executed.

2. The robot control system according to claim 1, wherein the second storage means which stores designation conditions to place the robot in a standstill state when the assigned functions are executed and stores output states to the robot at this time.

3. The robot control system according to claim 1, further comprising a backup battery for keep the memory of strage means.

4. A robot control system comprising:

teaching means which have a plurality of keys for teaching an operation program;

robot control unit which controls an operation of a robot by the teaching of the operation program, which includes:

input/output control means which inputs and outputs input/output control data from and to an external machine connected thereto and a hand attached to an arm of a robot;

a control unit which assigns functions to instruct a control of the input/output control means to the keys of the teaching means;

a first storage means which stores the functions assigned to the keys, a second storage means which stores designation conditions to place the robot in a standstill state when the assigned functions are not executed.

5. The robot control system according to claim 4, wherein the second storage means which stores designation conditions to place the robot in a standstill state when the assigned functions are executed and stores output states to the robot at this time.

6. The robot control system according to claim 4, further comprising a backup battery for keeping the memory of storage means.

7. A robot control method comprising:

assigning step of assigning functions to keys of teaching means according to teaching of teaching means;

first storage step of storing the function assigned to the keys;

interlock setting step of a setting condition to place the robot in a standstill state;

second storage step of storing the setting condition; and interlock control step of placing the robot in a standstill state when the setting conditions agree with outputs of the control means.

8. The robot control method according to claim 7, wherein the setting condition is decided on setting the assigned function is one of ON state and OFF state.

* * * * *